(12) United States Patent
Strafiel et al.

(10) Patent No.: US 11,916,391 B2
(45) Date of Patent: Feb. 27, 2024

(54) METHOD FOR CONTROLLING A WIND POWER INSTALLATION

(71) Applicant: Wobben Properties GmbH, Aurich (DE)

(72) Inventors: Christian Strafiel, Aurich (DE); Stefan Gertjegerdes, Aurich (DE); Aramis Schwanka Trevisan, Aurich (DE); Ingo Mackensen, Aurich (DE)

(73) Assignee: Wobben Properties GmbH, Aurich (DE)

( * ) Notice: Subject to any disclaimer, the term of this patent is extended or adjusted under 35 U.S.C. 154(b) by 147 days.

(21) Appl. No.: 17/119,414

(22) Filed: Dec. 11, 2020

(65) Prior Publication Data
US 2021/0184469 A1 Jun. 17, 2021

(30) Foreign Application Priority Data
Dec. 16, 2019 (DE) .......................... 102019134458.1

(51) Int. Cl.
*H02J 3/38* (2006.01)
*F03D 7/04* (2006.01)
(Continued)

(52) U.S. Cl.
CPC .............. *H02J 3/381* (2013.01); *F03D 7/048* (2013.01); *H02J 1/106* (2020.01); *H02J 1/14* (2013.01);
(Continued)

(58) Field of Classification Search
CPC ................................... H02J 1/106; H02J 3/18
(Continued)

(56) References Cited

U.S. PATENT DOCUMENTS 7,423,412 B2 9/2008 Weng et al.
8,390,138 B2 3/2013 Fortmann et al.
(Continued)

FOREIGN PATENT DOCUMENTS

DE 102007005165 A1 8/2007
DE 102010015440 A1 10/2011
(Continued)

*Primary Examiner* — Daniel Kessie
*Assistant Examiner* — Dru M Parries
(74) *Attorney, Agent, or Firm* — Seed IP Law Group LLP

(57) ABSTRACT

Provided is a method for controlling a wind power installation and/or a wind farm having at least one wind power installation, particularly in the case of asymmetrical network voltages, comprising: measuring a first voltage of a first phase, a second voltage of a second phase and a third voltage of a third phase of a three-phase electrical system, calculating a symmetrical negative-sequence voltage system from the measured voltages including a first negative-sequence voltage, a second negative-sequence voltage and a third negative-sequence voltage, predefining setpoints for a negative-sequence current system depending on the calculated, symmetrical negative-sequence voltage system including a first negative-sequence current component, a second negative-sequence current component and a third negative-sequence current component, wherein the setpoints are defined such that a balancing of the measured voltages is achieved, feeding an asymmetrical three-phase AC current into a wind farm network or an electrical supply network depending on the predefined setpoints.

16 Claims, 3 Drawing Sheets

(51) Int. Cl.
*H02J 1/10* (2006.01)
*H02J 1/14* (2006.01)
*H02J 3/00* (2006.01)
*H02J 3/04* (2006.01)
*H02J 3/14* (2006.01)
*H02J 3/18* (2006.01)

(52) U.S. Cl.
CPC ............... *H02J 3/007* (2020.01); *H02J 3/04* (2013.01); *H02J 3/14* (2013.01); *H02J 3/1814* (2013.01); *H02J 2300/28* (2020.01)

(58) Field of Classification Search
USPC .......................................................... 307/43
See application file for complete search history.

(56) References Cited

U.S. PATENT DOCUMENTS

| | | |
|---|---|---|
| 8,699,245 B2 | 4/2014 | Bücker |
| 10,066,603 B2 | 9/2018 | Diedrichs |
| 2011/0215775 A1 | 9/2011 | Engelhardt et al. |
| 2016/0248342 A1* | 8/2016 | Yu ........................... H02M 1/08 |

FOREIGN PATENT DOCUMENTS

| | | |
|---|---|---|
| DE | 102012220582 A1 | 7/2014 |
| WO | 2008/061698 A2 | 5/2008 |
| WO | 2012/062323 A2 | 5/2012 |

\* cited by examiner

METHOD FOR CONTROLLING A WIND POWER INSTALLATION

BACKGROUND

Technical Field

The present invention relates to a method for controlling a wind power installation and/or a wind farm having at least one wind power installation.

Description of the Related Art

Wind power installations normally feed an essentially symmetrical current into a three-phase wind farm network and/or a three-phase electrical supply network.

The feed-in of a three-phase symmetrical current can essentially also be referred to as symmetrical feed-in.

A symmetrical feed-in means, in particular, that the fed in current has three phases having the same amplitude, essentially shifted through 120° in relation to one another.

Insofar as the three-phase wind farm network and/or the three-phase electrical supply network has, for example, an asymmetrical network voltage, i.e., three phases having different amplitudes and/or three phases having different phase shifts, a symmetrical feed-in cannot usually eliminate this asymmetrical fault.

Asymmetrical network voltages of this type can be caused, for example, by long overhead lines to which the wind power installation or wind farm is connected.

BRIEF SUMMARY

Balancing the network voltage, particularly in a normal operation of a wind power installation and/or wind farm is provided.

A method is therefore proposed for controlling a wind power installation and/or a wind farm having at least one wind power installation, particularly in the case of asymmetrical network voltages, comprising the following steps: measuring a first voltage of a first phase, a second voltage of a second phase and a third voltage of a third phase of a three-phase electrical system, calculating a symmetrical negative-sequence voltage system from the measured voltages, comprising: a first negative-sequence voltage, a second negative-sequence voltage and a third negative-sequence voltage, predefining setpoints for a negative-sequence current system depending on the calculated, symmetrical negative-sequence voltage system, comprising: a first negative-sequence current component for the first phase, a second negative-sequence current component for the second phase and a third negative-sequence current component for the third phase, wherein the setpoints are defined in such a way that a balancing of the measured voltages is achieved, feeding an asymmetrical three-phase AC current into a wind farm network or an electrical supply network depending on the predefined setpoints.

The wind power installation or wind farm is therefore preferably connected to a three-phase electrical network, for example to a wind farm network or an electrical supply network.

The wind power installation or wind farm is preferably connected at a connection point to a three-phase electrical wind farm network or a three-phase electrical supply network, wherein the connection point has, in particular, an asymmetrical network voltage which is caused, in particular, by a network topology.

In a first step, the voltages of the electrical network are then measured, for example by measuring the voltages at the connection point of the wind power installation.

The connection point may, for example, be the converter of the wind power installation or the network connection point of the wind farm.

At least one symmetrical negative-sequence voltage system is then calculated from the voltages measured in this way, for example by means of the symmetrical components method.

The negative-sequence voltage system then preferably has a first negative-sequence voltage, a second negative-sequence voltage and a third negative-sequence voltage. These three negative-sequence voltages are preferably phase-shifted in each case through 120° in relation to one another.

Setpoints for a negative-sequence current system are then determined from this symmetrical negative-sequence voltage system, said setpoints being defined in such a way that a balancing of the measured voltages is achieved, particularly at the connection point.

A regulator, for example, which is configured to regulate the negative-sequence voltage to zero can be used for this purpose, wherein the control variable is the negative-sequence current, and an ideal negative-sequence system is used which is zero, i.e., has no asymmetry. The nominal voltage in the negative-sequence system is therefore zero, i.e., the calculated negative-sequence voltage can be used directly as the regulator input, wherein the negative-sequence current forms the regulator output or control variable.

An asymmetrical, three-phase AC current is then generated by means of the wind power installation or wind farm depending on these setpoints and is fed into the wind farm network or the electrical supply network.

The wind power installation has, for example, an inverter, preferably a full inverter, to feed in the asymmetrical three-phase AC current. The inverter can comprise, for example, a plurality of inverter modules and/or can be controlled by means of a controller.

Is therefore proposed, in particular, to control a (full) inverter of a wind power installation in normal operation in such a way that the electrical network is balanced, i.e., the level of network symmetry is improved.

An asymmetrical voltage in the electrical network can be counteracted by means of the asymmetrical feed-in, in particular of an asymmetrical current, particularly in such a way that the voltage in the electrical network is balanced.

The proposed method is therefore particularly well-suited for use on connection points with constantly asymmetrical network voltages, of the type which can occur, for example, on long overhead lines, for example in Canada or in Russia, but also in Brazil, Australia or Sweden.

In addition, the proposed method further enables feed-in in such a way that a twisting of long transmission lines can be eliminated.

In this respect, it is furthermore also proposed, in particular, to use the method described above or below in addition to a conventional symmetrical feed-in, particularly if the wind power installation or wind farm is connected at a network connection point of an electrical network which tends to have an asymmetrical voltage due to the network topology.

Measuring the first, second and third voltage preferably comprises at least measuring a first, second and third phase, in particular at the output of an inverter of the wind power installation and/or of a connection point.

The wind power installation or wind farm is therefore preferably connected at a connection point to a wind farm network or to an electrical supply network.

The wind power installation further has at least one inverter which is configured to feed an asymmetrical three-phase AC current into the wind farm network and/or the electrical supply network.

In one preferred embodiment, the inverter has at least one controller for this purpose which is configured to carry out a method described above or below.

In particular, the inverter has a voltmeter for measuring the first, second and third voltage, preferably measuring the voltages at the output of the inverter.

Measuring the first, second and third voltage preferably comprises determining a corresponding first, second and third phase position and a corresponding first, second and third amplitude.

It is therefore also proposed, in particular, that the amplitude and phase position of all voltages are measured.

The measuring of the first, second and third voltage is preferably performed by means of a three-phase voltmeter which is configured in each case to measure an amplitude and a phase position.

In one particularly preferred embodiment, the three-phase voltmeter is connected in a signal-conducting manner to a or the controller of a or the inverter of the wind power installation.

The setpoints are preferably defined for a point at an output of a or the inverter.

It is therefore also proposed, in particular, that the balancing is performed at the output of the inverter, in particular of the wind power installation, i.e., in particular, essentially where the voltages are also measured.

The feed-in is preferably performed using a current limitation with a factor k.

It is therefore also proposed, in particular, that the method described above or below is carried out using a current limitation (limiter), in particular a dynamic current limitation.

This is particularly advantageous if the method described above or below is carried out in addition to a normal feed-in.

In particular, the underlying assumption here is that, with overlay of a symmetrical system (normal feed-in; positive-sequence system) and asymmetrical feed-in (for balancing; negative-sequence system), current amplitudes can occur which are greater than the maximum permissible values, for example of the inverter.

In one particularly preferred embodiment, the current limitation is performed depending on the positive-sequence system.

The calculated negative-sequence voltages are preferably transformed into dq coordinates by means of an amplitude-invariant dq transformation (transformer or processor).

It is therefore also proposed, in particular, to transform the calculated negative-sequence voltages into rotating dq coordinates by means of an amplitude-invariant dq transformation.

The negative-sequence voltages are therefore transferred into a rotating dq reference system.

The d and q components created in this way can then be filtered, in particular to eliminate network distortions and high-frequency measurement noise, and are fed to a regulating chain which determines the corresponding negative-sequence currents.

The method furthermore preferably comprises the following step: calculating a symmetrical positive-sequence voltage system from the measured voltages, comprising: a first positive-sequence voltage, a second positive-sequence voltage and a third positive-sequence voltage.

It is therefore proposed, in particular, that the method comprises two partial methods.

A first partial method which regulates the power flow symmetrically in the positive-sequence system which is predefined, for example, by power setpoints, and a second partial method which regulates the balancing of the electrical network asymmetrically in the negative-sequence system.

A current is thereby created comprising two components, wherein a first component serves to feed corresponding power of a power setpoint into the electrical network, and a second component which serves to balance the electrical network.

It is therefore also proposed, in particular, to use the method in addition to a conventional symmetrical feed-in, particularly if the wind power installation or wind farm is connected at a network connection point of an electrical network which tends to have an asymmetrical voltage due to the network topology.

A wind power installation and/or a wind farm is further proposed, comprising at least one controller which is configured to carry out a method described above or below.

The wind power installation or wind farm preferably comprises at least one inverter and a controller, wherein the controller is configured to carry out a method described above or below.

The wind power installation or wind farm furthermore preferably comprises a measuring device (voltmeter) which is configured to measure the amplitude and phase position of a three-phase AC voltage and calculate at least one symmetrical negative-sequence voltage system therefrom.

The wind power installation or wind farm furthermore preferably comprises a transformer (processor) which is configured to transform a symmetrical negative-sequence voltage system into dq coordinates.

The wind power installation or wind farm furthermore preferably comprises a controller which is configured to define setpoints for a negative-sequence current system in dq coordinates.

The wind power installation furthermore preferably comprises an, in particular dynamic, limitation of d and/or q negative-sequence current amplitudes.

The measuring device (voltmeter) described above, the transformer described above and the current setpoint controller described above may, for example, form part of a common controller and interact with one another as described below.

BRIEF DESCRIPTION OF THE SEVERAL VIEWS OF THE DRAWINGS

The present invention will now be described in detail below by way of example on the basis of example embodiments with reference to the accompanying figures, wherein the same reference numbers are used for identical or similar assemblies.

DETAILED DESCRIPTION

Figure 1:
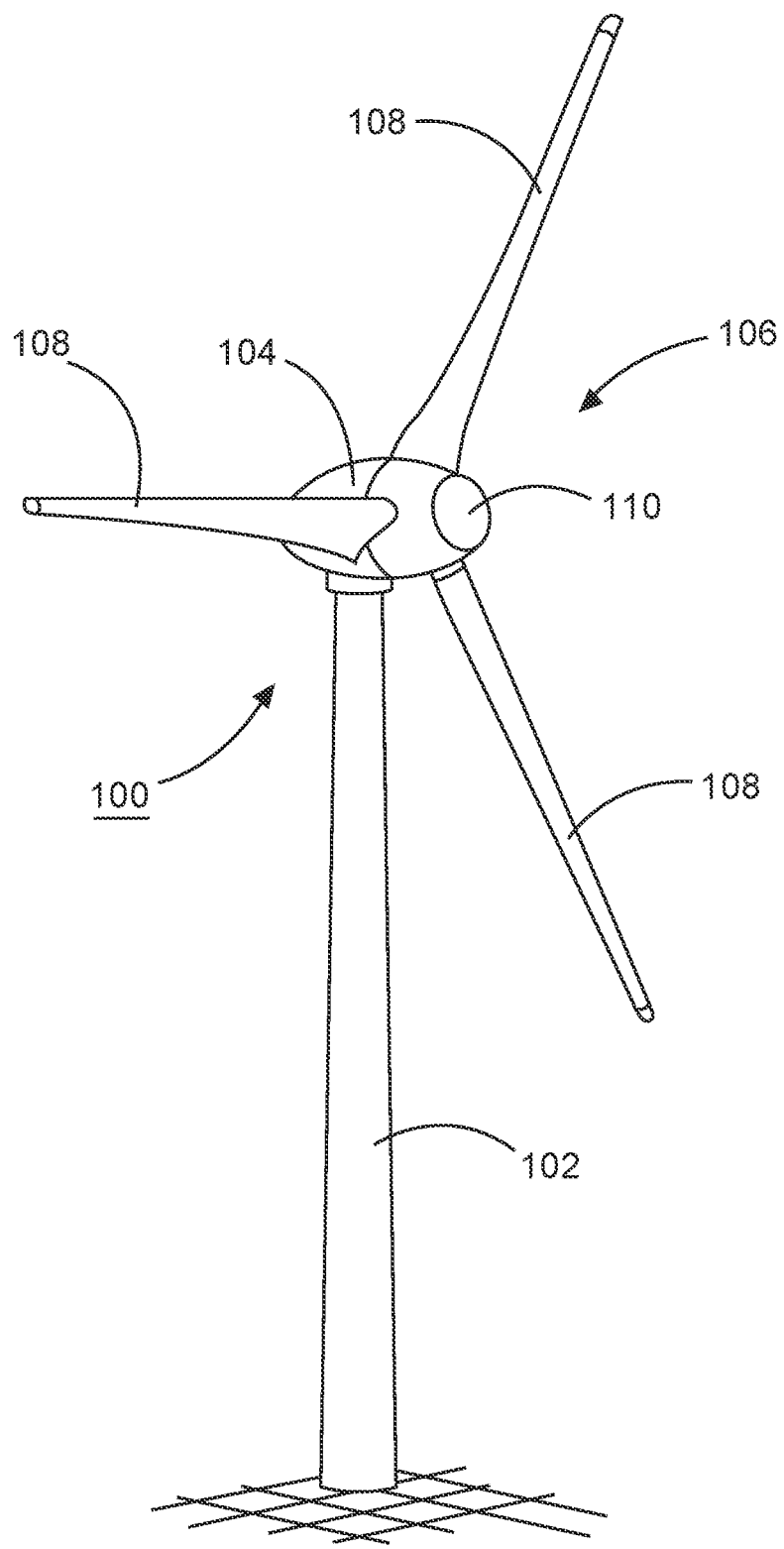
FIG. 1 shows a schematic view of a wind power installation according to one embodiment.

FIG. 1 shows a schematic view of a wind power installation 100 according to one embodiment.

The wind power installation 100 has a tower 102 and a nacelle 104 for this purpose. An aerodynamic rotor 106 with three rotor blades 108 and a spinner 110 is disposed on the nacelle 104. The rotor 106 is set in rotational motion by the wind during operation and thereby drives a generator in the nacelle 104.

The generator is connected by means of an inverter to an electrical network, for example a wind farm network or an electrical supply network in order to feed in an, in particular, asymmetrical three-phase AC current.

The inverter has a controller for this purpose which is configured to carry out a method described above or below.

Figure 2:
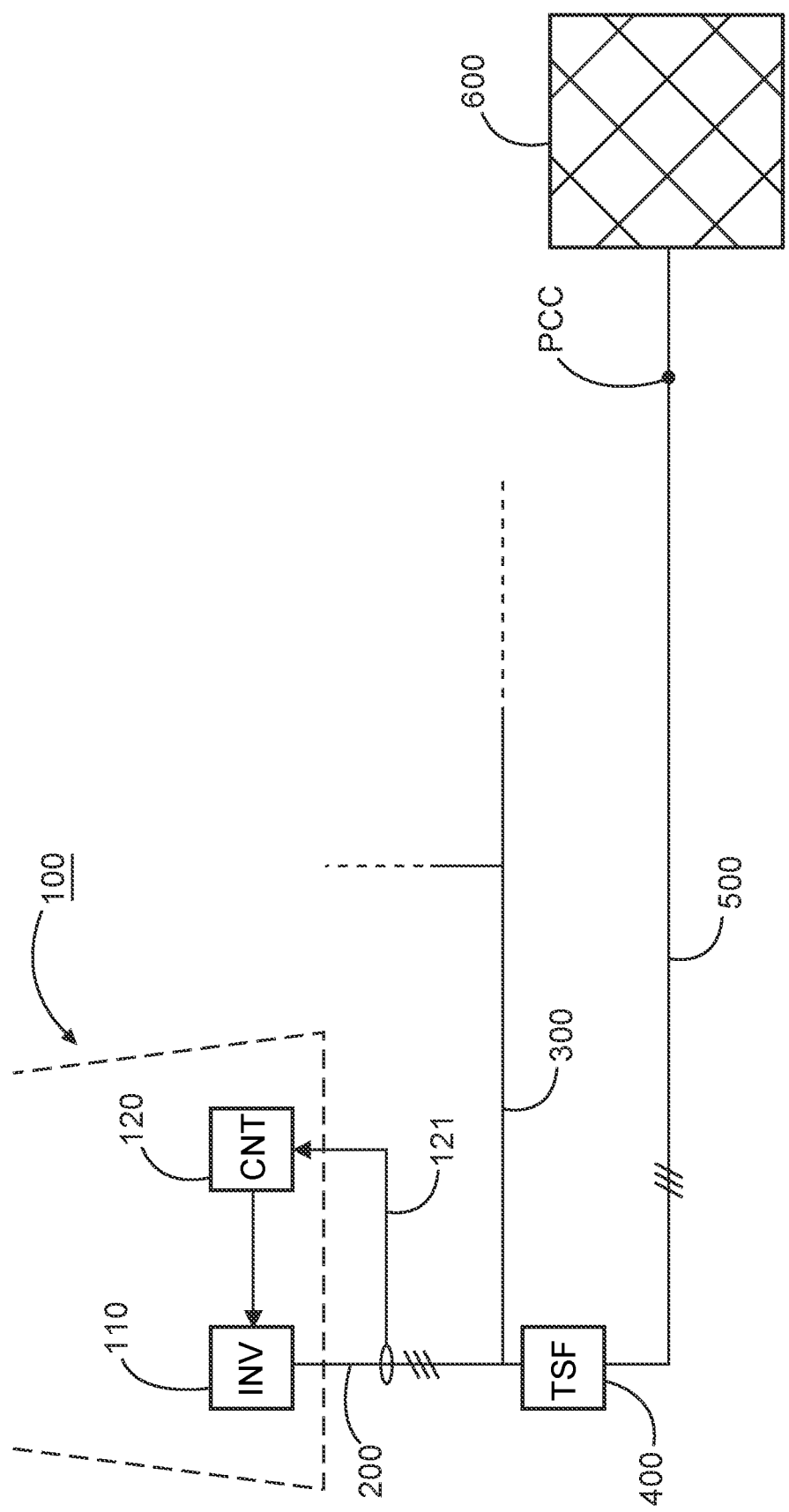
FIG. 2 shows a schematic view of a wind power installation at a connection point according to one embodiment.

FIG. 2 shows a schematic view of a wind power installation 100 at a connection point 200 according to one embodiment.

The wind power installation 100 has an inverter 110 and a controller 120.

The controller 120 is configured to carry out a method described above or below and, in particular, to control the inverter 110 by means of setpoints in such a way that said inverter 110 generates an asymmetrical three-phase AC current.

To do this, the controller 120 has, inter alia, a voltmeter 121 which is configured to measure a first voltage of a first phase, a second voltage of a second phase and a third voltage of a third phase, in particular the three phases of the wind farm network 300.

The asymmetrical three-phase AC current is fed by the inverter 110 at the connection point, for example into a wind farm network 300 which interconnects a plurality of wind power installations.

The wind farm network 300 is further connected via a transformer 400 and a connection line 500 at a network connection point PCC to an electrical supply network 600.

In the area of the network connection point PCC, the electrical supply network 600 preferably has a topology with predominantly long lines, i.e., lines having a length greater than 100 km. Topologies of this type are prevalent above all in rural regions of territorial states, such as, for example, Canada or Russia, as a result of which an asymmetrical voltage is present at the network connection point.

Figure 3:
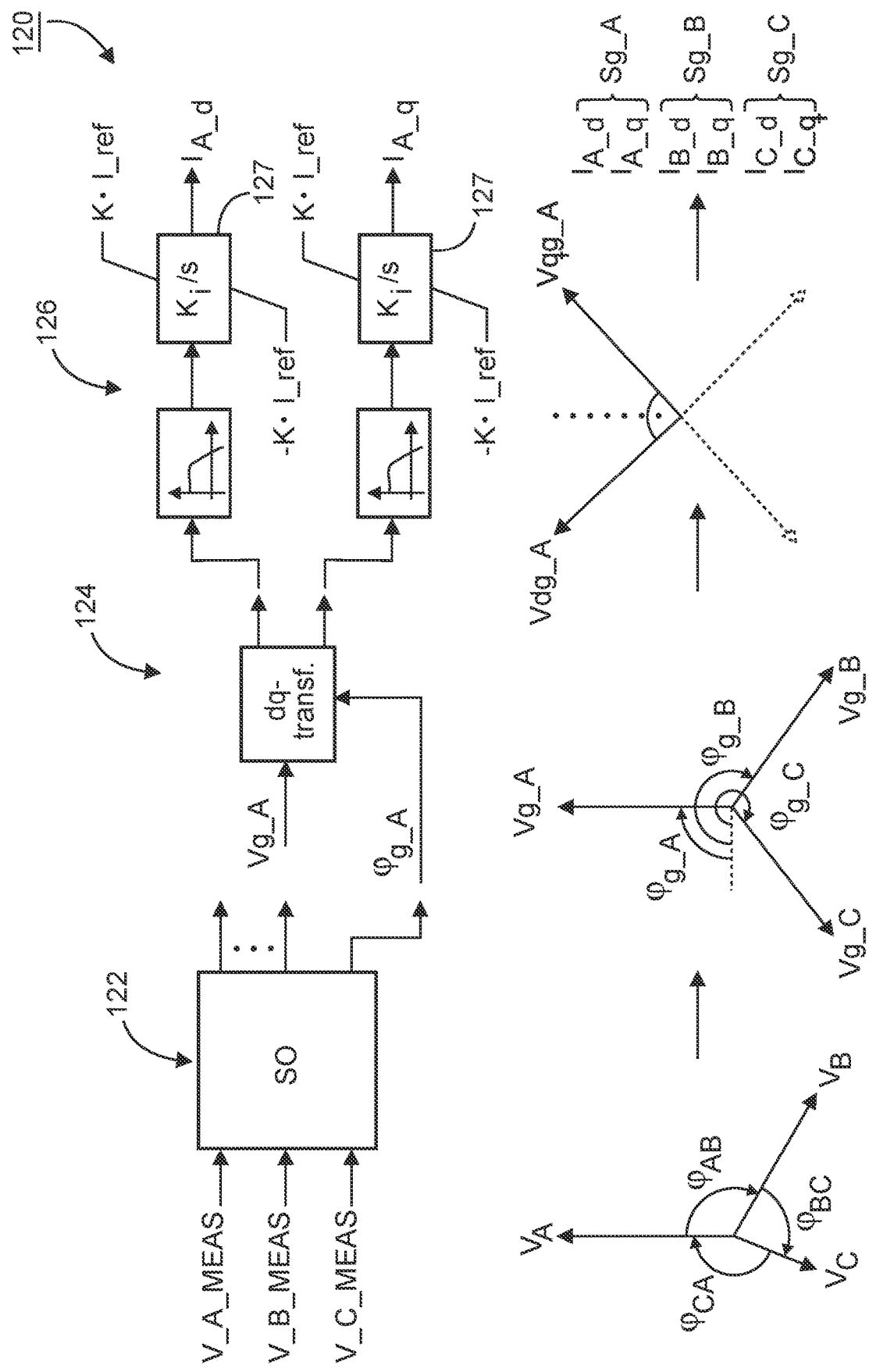
FIG. 3 shows a schematic view of a controller of a wind power installation according to one embodiment.

FIG. 3 shows a schematic view of a controller of a wind power installation according to one embodiment.

The controller 120 comprises at least one measuring device (voltmeter) 122, a transformer (processor) 124 and a current setpoint controller 126 at least having an, in particular dynamic, limitation of d and/or q negative-sequence current amplitudes 127, 128.

The measuring device (voltmeter) 122 is preferably designed as a state observer SO and is configured to measure a first voltage V_A_meas of a first phase A, a second voltage V_B_meas of a second phase B and a third voltage V_C_meas, preferably by measuring the first, second and third phase at the connection point of the wind power installation, as shown, for example, in FIG. 2.

The measuring device (voltmeter) 122 therefore measures the asymmetrical system V_A, V_B, V_C, φ_AB, φ_BC, φ_CA and calculates a negative-sequence voltage system therefrom, comprising: a first negative-sequence voltage Vg_A having a first phase angle φg A, a second negative-sequence voltage Vg_B having a second phase angle φg_B and a third negative-sequence voltage Vg_C having a third phase angle φg_C.

This, in particular symmetrical, negative-sequence voltage system Vg_A, Vg_B, Vg_C is transformed by the transformer 124 by means of an amplitude-invariant dq transformation into rotating dq coordinates Vdg_A, Vdg_B, Vdg_C, Vqg_A, Vqg_B, Vqg_C.

The setpoints Sg_A, Sg_B., Sg_C for a negative-sequence current system Ig_A, Ig_B, Ig_C are then calculated by means of the current setpoint controller 126 from these transformed dq coordinates Vdg_A, Vdg_B, Vdg_C, Vqg_A, Vqg_B, Vqg_C, particularly in the dq coordinates IA_d, IA_q, IB_d, IB_q, IC_d, IC_q.

In order to protect the wind power installation or inverter against overcurrents, it is further proposed that the current setpoint controller 126 has at least one, in particular dynamic, limitation of d and/or q negative-sequence current amplitudes 127, 128.

The limitation of d and/or q negative-sequence current amplitudes 127, 128 in each case comprising a relative minimum value-k*I_ref and a relative maximum value k*I_ref, wherein k is an adjustable constant and I_ref is a variable current reference value which is predefined, in particular, depending on a positive-sequence current system.

In particular as provided herein the negative-sequence voltage calculated from the three-phase voltages measured in the connection point is transformed into the rotating dq reference system.

The d and q components of the negative-sequence voltage are then, for example, filtered in order to filter out network distortions and high-frequency measurement noise.

The filtered d and q components of the negative-sequence voltage serve as an input parameter of a regulator chain which attempts to regulate the d and q components of the negative-sequence voltage to zero by feeding in negative-sequence currents of the same d and q axes.

In order to avoid an essentially pure negative-sequence current feed-in in special cases and take into account the maximum currents specified by the converter hardware, a dynamic limitation of the d and q negative-sequence current amplitudes is performed depending on the current reference values for the positive-sequence current.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a wind power installation or a wind farm including at least the wind power installation, comprising:
measuring, for a three-phase electrical system, a first voltage of a first phase, a second voltage of a second phase and a third voltage of a third phase;
determining, from the first, second and third measured voltages, a symmetrical negative-sequence voltage system including a first negative-sequence voltage, a second negative-sequence voltage, and a third negative-sequence voltage;
configuring, using a transformation and depending on the determined symmetrical negative-sequence voltage system, setpoints for a negative-sequence current system including a first negative-sequence system component for the first phase, a second negative-sequence system component for the second phase and a third negative-sequence system component for the third phase, wherein the setpoints are configured to balance the first, second and third voltages, configuring the setpoints including:
  transforming the determined first, second and third negative-sequence voltages into respective dq coordinates using an amplitude-invariant dq transformation, wherein the first negative-sequence voltage is transformed into a first pair of amplitude-invariant dq coordinates, wherein each amplitude-invariant dq coordinate of the first pair of amplitude-invariant dq coordinates has the same amplitude as the first negative-sequence voltage and a phase angle that is modified based on the first negative-sequence voltage; and
  transforming the respective dq coordinates into respective abc coordinates to produce the setpoints for the negative-sequence current system; and
feeding an asymmetrical three-phase AC current into a wind farm network or an electrical supply network depending on the configured setpoints.

2. The method as claimed in claim 1, wherein measuring the first, second and third voltages includes:
  measuring first, second and third phases of the first, second and third voltages, respectively, at an output of an inverter of the wind power installation.

3. The method as claimed in claim 2, wherein measuring the first, second and third voltage includes:
  determining corresponding first, second and third phase positions of the first, second and third phases, respectively, and corresponding first, second and third amplitudes of the first, second and third voltages, respectively.

4. The method as claimed in claim 1, wherein the setpoints are defined for a point at an output of an inverter.

5. The method as claimed in claim 1, comprising:
  feeding the asymmetrical three-phase AC current using current limitation with a factor k.

6. The method as claimed in claim 1, comprising:
  determining, from the measured first, second and third voltages, a symmetrical positive-sequence voltage system including a first positive-sequence voltage, a second positive-sequence voltage and a third positive-sequence voltage.

7. A wind power installation, comprising:
  at least one inverter; and
  a controller configured to:
    receive, for a three-phase electrical system, measurements of a first voltage of a first phase, a second voltage of a second phase and a third voltage of a third phase;
    determine, from the first, second and third measured voltages, a symmetrical negative-sequence voltage system including a first negative-sequence voltage, a second negative-sequence voltage and a third negative-sequence voltage;
    configure, using a transformation and depending on the determined symmetrical negative-sequence voltage system, setpoints for a negative-sequence current system including a first negative-sequence system component for the first phase, a second negative-sequence system component for the second phase and a third negative-sequence system component for the third phase, wherein the setpoints are configured to balance the first, second and third voltages configuring the setpoints including:
      transforming the determined first, second and third negative-sequence voltages into respective dq coordinates using an amplitude-invariant dq transformation, wherein the first negative-sequence voltage is transformed into a first pair of amplitude-invariant dq coordinates, wherein each amplitude-invariant dq coordinate of the first pair of amplitude-invariant dq coordinates has the same amplitude as the first negative-sequence voltage and a phase angle that is modified based on the first negative-sequence voltage; and
      transforming the respective dq coordinates into respective abc coordinates to produce the setpoints for the negative-sequence current system; and
    cause an asymmetrical three-phase AC current to be fed into a wind farm network or an electrical supply network depending on the configured setpoints.

8. The wind power installation as claimed in claim 7, comprising:
  a voltmeter configured to measure an amplitude and a phase position for each of the first voltage of the first phase, the second voltage of the second phase and the third voltage of the third phase for determining the symmetrical negative-sequence voltage system therefrom.

9. The wind power installation as claimed in claim 7, comprising:
  a processor configured to transform the symmetrical negative-sequence voltage system into dq coordinates.

10. The wind power installation as claimed in claim 9, comprising:
  a current setpoint controller is configured to define the setpoints based on the dq coordinates for a negative-sequence current system.

11. The wind power installation as claimed in claim 10, further comprising:
  a dynamic limiter d and/or q negative-sequence current amplitudes.

12. A wind farm, comprising:
  at least one inverter; and
  a controller configured to:
    receive, for a three-phase electrical system, measurements of a first voltage of a first phase, a second voltage of a second phase and a third voltage of a third phase;
    determine, from the first, second and third measured voltages, a symmetrical negative-sequence voltage system including a first negative-sequence voltage, a second negative-sequence voltage and a third negative-sequence voltage;
    configure, using a transformation and depending on the determined symmetrical negative-sequence voltage system, setpoints for a negative-sequence current system including a first negative-sequence system component for the first phase, a second negative-sequence system component for the second phase and a third negative-sequence system component for the third phase, wherein the setpoints are configured to balance the first, second and third voltages configuring the setpoints including:
      transforming the determined first, second and third negative-sequence voltages into respective dq coordinates using an amplitude-invariant dq transformation, wherein the first negative-sequence voltage is transformed into a first pair of amplitude-invariant dq coordinates, wherein each amplitude-invariant dq coordinate of the first pair of amplitude-invariant dq coordinates has the same amplitude as the first negative-sequence voltage and a phase angle that is modified based on the first negative-sequence voltage; and transforming the respective dq coordinates into respective abc coordinates to produce the setpoints for the negative-sequence current system; and cause an asymmetrical three-phase AC current to be fed into a wind farm network or an electrical supply network depending on the configured setpoints.

13. The wind farm as claimed in claim 12, comprising:
a voltmeter configured to measure an amplitude and a phase position for each of the first voltage of the first phase, the second voltage of the second phase and the third voltage of the third phase for determining the symmetrical negative-sequence voltage system therefrom.

14. The wind farm as claimed in claim 12, comprising:
a processor configured to transform the symmetrical negative-sequence voltage system into dq coordinates.

15. The wind farm as claimed in claim 14, comprising:
a current setpoint controller is configured to define the setpoints based on the dq coordinates for a negative-sequence current system.

16. The wind farm as claimed in claim 15, further comprising:
a dynamic limiter d and/or q negative-sequence current amplitudes.

* * * * *